(12) United States Patent
Charlier et al.

(10) Patent No.: US 6,265,712 B1
(45) Date of Patent: Jul. 24, 2001

(54) IR SENSOR WITH REFLECTIVE CALIBRATION

(75) Inventors: Olivier Charlier, Brussels (BE); William R. Betts, Burntwood (GB); Roger Diels, Erps-Kwerps (BE)

(73) Assignee: Melexis NV, Leper (BE)

( * ) Notice: Subject to any disclaimer, the term of this patent is extended or adjusted under 35 U.S.C. 154(b) by 0 days.

(21) Appl. No.: 09/262,896

(22) Filed: Mar. 10, 1999

(51) Int. Cl.⁷ ........................................... G01J 5/04
(52) U.S. Cl. ........................................... 250/252.1
(58) Field of Search ............................. 250/252.1

(56) References Cited

U.S. PATENT DOCUMENTS

| | | |
|---|---|---|
| 4,365,896 | 12/1982 | Mihalow . |
| 4,435,093 | 3/1984 | Krause . |
| 4,560,874 | 12/1985 | Cinzori et al. . |
| 5,200,624 | 4/1993 | Pederson, Jr. et al. . |
| 5,531,377 | 7/1996 | Thayer et al. . |
| 6,122,042 | * 9/2000 | Wunderman et al. .............. 356/73 |

FOREIGN PATENT DOCUMENTS

| | | |
|---|---|---|
| 147 872 | 4/1981 | (DE) . |
| 3518262 A1 | 11/1986 | (DE) . |
| WO 99/01726 | 5/1998 | (WO) . |

* cited by examiner

Primary Examiner—Constantine Hannaher
Assistant Examiner—Otilia Gabor
(74) Attorney, Agent, or Firm—Townsend & Townsend & Crew LLP (57) ABSTRACT

A self-calibrating infrared (IR) sensing device having the capability to measure the attenuation effects of surface contamination on the transmission window and to adjust the gain of the sensor accordingly so as to counter the attenuation. The IR sensing device includes an IR sensor mounted in a housing having an IR transparent window that allows IR radiation originating from outside the housing to be directed toward the sensor. The IR sensor includes a thermally isolated area of IR-absorbing material coupled to a temperature measuring unit. IR radiation impinging on the sensor is absorbed, thereby raising the temperature of the IR absorbing material. The temperature measuring unit measures the increase in temperature and generates a proportional electronic signal indicative of the temperature. The electronic signal is received and processed by a processor. An IR radiator is also included within the sensing device housing. When activated, the radiator emits IR radiation that passes through the window and is lost to the outside if there is no contamination. If the surface of the window is contaminated, the radiation raises the temperature of the contaminants. This increase in temperature results in a return signal (i.e., IR emissions from the contaminants) that is detected by the sensor. The magnitude of the return signal indicates the amount of contaminant on the surface of the window. The return signal is detected and measured by the IR sensor, and is used to signal a warning and/or determine the amount of gain necessary to compensate for the loss of true signal caused by the presence of the contamination.

28 Claims, 6 Drawing Sheets

IR SENSOR WITH REFLECTIVE CALIBRATION

BACKGROUND OF THE INVENTION

The present invention relates in general to infrared (IR) sensing devices, and more particularly to a self-calibrating IR sensing device.

IR sensors are used to measure temperatures of remote objects by detecting the infrared radiation emitted from the target object. In a typical configuration, IR radiation enters the housing in which the sensor element is located through an IR transparent window and impinges upon the sensor. The temperature is typically measured by detecting the IR radiation and determining its effect on a thermally isolated radiation absorbing area of the sensor. When the surface of the window becomes contaminated by particles or residues that absorb IR radiation, incoming IR radiation is absorbed such that the amount of IR radiation passing through the window becomes attenuated. The IR transmission capability of the window is therefore degraded by the presence of IR-absorbing contaminants. Such degradation results in erroneous temperature readings by the sensor. Accordingly, what is needed in the art is the ability to easily counter the attenuation effects of IR-absorbing contaminants deposited on the transmission window so as to accurately detect and measure the IR radiation received from a target object.

SUMMARY OF THE INVENTION

The present invention provides a self-calibrating infrared (IR) sensing device having the capability to measure the attenuation effects of surface contamination on the transmission window and to adjust the gain of the sensor accordingly so as to counter the attenuation caused by any IR-absorbing contaminants on the transmission window.

According to the invention, an IR sensing device includes an IR sensor mounted in a housing having an IR transparent window that allows IR radiation originating from outside the housing to be directed toward the sensor. The radiation detected by the sensor is made up of a combination of the external IR radiation entering the housing through the IR transparent window and the inherent background radiation from the inner surface of the housing. The IR sensor includes a thermally isolated area of material selected for its ability to absorb IR radiation at a specific frequency or at a range of radiation frequencies. The incoming radiation is absorbed, thereby raising the temperature of the IR absorbing material. A temperature measuring unit coupled to the absorbing material measures the increase in temperature and generates a proportional electronic signal indicative of the temperature. The electronic signal is received and processed by a processor.

An IR radiator is also included within the sensing device housing. When activated, the radiator emits IR radiation that passes through the window and is lost to the outside if there is no contamination. If, however, the surface of the window is contaminated, the radiation raises the temperature of the contaminants. This increase in temperature results in a return signal (i.e., IR emissions from the contaminants) that is detected by the sensor. For example, if the radiator is pulsed, the resulting return signal will be in the shape of decaying pulses. The magnitude of the return signal indicates the amount of contaminant on the surface of the window. The return signal is detected and measured by the IR sensor, and is used to signal a warning and/or determine the amount of gain necessary to compensate for the loss of true signal caused by the presence of the contamination. Additionally, IR radiation that falls on the inside of the housing is reflected back to the sensor. If the inside surface of the housing is uncontaminated, the return signal will be as expected. If, however, the housing is internally corroded or contaminated, perhaps indicative of leakage, the return signal will be higher as the contamination heats up and emits IR radiation. Again, the appropriate gain is determined to compensate for any contamination in the housing.

According to an aspect of the invention, an IR sensing device is provided. The IR sensing device includes an IR sensor for detecting IR radiation, wherein the IR sensor generates electrical signals in response to and indicative of any IR radiation detected by the IR sensor. The sensing device also typically includes an IR opaque enclosure surrounding the IR sensor, the enclosure having an IR transparent window positioned to allow IR radiation from outside the enclosure to fall on the IR sensor, and an IR radiator positioned within the enclosure, wherein the IR radiator emits IR radiation. In operation, at least a portion of a first IR radiation signal generated by the IR radiator is absorbed by IR-absorbing material on the window. In response, the IR absorbing material emits a return IR radiation signal that is detected by the IR sensor, which generates a first electric signal proportional to the return IR radiation signal. The sensing device also typically includes a processor coupled to the IR sensor for analyzing the electrical signals generated by the IR sensor, wherein the processor receives and analyzes the first electric signal to determine characteristics of the return signal.

According to another aspect of the invention a method of measuring the temperature of a remote target object with an IR sensing device, wherein the IR sensing device includes an IR sensor mounted in a housing, the housing having a window through which IR radiation from a remote target object enters the device and impinges on the IR sensor. The method typically includes the step of generating a first IR radiation signal with an IR radiator located within the housing, such that if there is any IR-absorbing contamination on the window, the contamination absorbs at least a portion of the first IR radiation signal and emits a return IR radiation signal. The method also typically includes the steps of detecting the return IR radiation signal with the IR sensor, and generating a first electric signal in response to the return IR radiation signal, wherein the first electric signal is proportional to the return signal. The method further typically includes the steps of analyzing the first electric signal with a processor to determine the amount of IR radiation in the return signal, wherein the amount of IR radiation in the return signal is indicative of the amount of IR absorbing contamination on the window. Thereafter a remote IR radiation signal generated by the remote object is detected, wherein the remote IR radiation signal is indicative of the temperature of the remote object, wherein the remote signal is attenuated by a first amount by the IR absorbing contamination before being detected by the IR sensor. The method also typically includes the step of compensating for the first amount of attenuation in the detected remote IR radiation signal so as to accurately determine the temperature of the remote object.

According to yet another aspect of the invention, an Infra Red (IR) sensing device is provided which typically comprises an IR sensing means for detecting IR radiation, wherein the IR sensing means generates an electrical signal responsive to and indicative of the level of IR radiation falling on it; electronic interface means for processing the electrical signal, wherein the interface means generates a signal representative of the IR radiation; and an IR opaque enclosure surrounding the IR sensing means and the electronic interface means, the enclosure including an IR transparent window arranged to allow IR radiation from a remote target object to fall on the IR sensing means. The device also typically comprises an IR radiating means for emitting IR radiation within the enclosure, the IR radiation means being arranged to radiate IR energy so as to have a heating effect on any non IR transparent contamination obscuring the IR transparent window; a first control means for controlling the IR radiation means to radiate IR energy for a known period; a signal processing means for determine the degree of contamination obscuring the IR transparent window by measuring the shape and characteristics of the electrical signal during and after the known period; and a second control means for modifying the characteristics of the electronic interface means to compensate for the degree of contamination.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
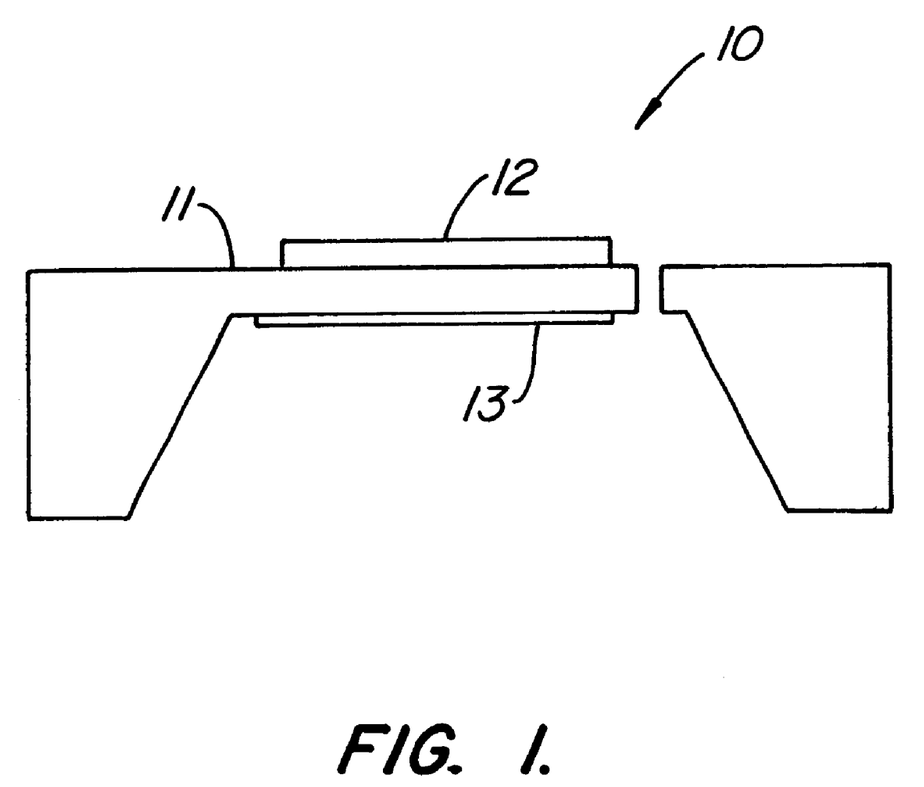
FIG. 1 is a sectional schematic diagram of a typical IR sensor arrangement according to the present invention.

FIG. 1 is a sectional schematic diagram of an IR sensor arrangement 10 according to the present invention. IR sensor 10 includes an area of IR absorbing material 12 mounted on a substrate 11 with a temperature measuring unit 13 positioned as is well known to effectively measure the temperature of IR absorbing material 12. Absorbing material 12 includes material selected for its ability to absorb IR radiation at a specific frequency or at a range of radiation frequencies as required for specific applications. In preferred aspects, temperature measuring unit 13 is any temperature measuring device capable of generating an electrical signal responsive to and indicative of the temperature of the IR absorbing material. In more preferred aspects, temperature measuring unit 13 includes a plurality of thermopiles that generate a voltage on the order of approximately 100 microvolts per degree Celsius temperature rise. Examples of such thermopiles include Polysilicon—Aluminum junctions and Aluminum—Diffusion junctions. One hundred such thermopiles connected in series generate approximately ten milli-volts for a one degree Celsius temperature rise. This signal is amplified using well know means arranged to compensate for such inherent errors as offsets, gain variations, unwanted temperature dependencies and drift. The parameters associated with the correction of these inherent errors are stored in a non-volatile memory to permit calibration of the sensing arrangement after manufacture and installation in a housing as will be described in more detail below. Calibration of the sensor is accomplished, for example, by using a heating element embedded in insulated absorbing area 12. Passing a current through the heating element causes the temperature of the absorbing material 12 to rise by a controlled amount. This effect is measured and used to calibrate the sensor.

Substrate 11 is preferably as thin as possible so that temperature measurement unit 13 is as close as possible to IR absorbing material 12. In addition, substrate 11 is preferably arranged such that the thin section of substrate 11 between absorbing material 12 and temperature measuring unit 13 is thermally isolated from the bulk of the arrangement. This helps ensure that heat loss from (the thin area of) substrate 11 does not degrade the accuracy of the signal generated by temperature measurement unit 13.

Figure 2:
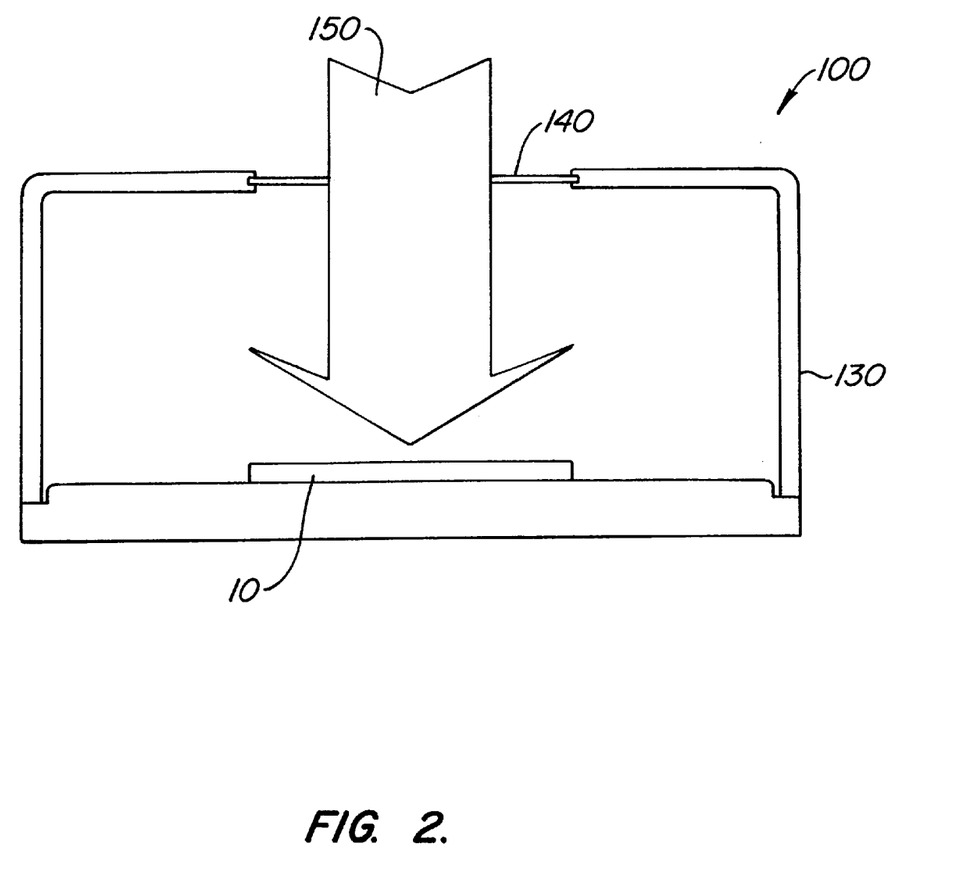
FIG. 2 is a sectional schematic diagram of an assembled IR sensing device including the IR sensor of FIG. 1, according to an embodiment of the present invention.

FIG. 2 is a sectional schematic diagram of an assembled IR sensing device 100 including IR sensor 10, according to an embodiment of the present invention. IR sensor 10 is mounted in a housing 130 having a window 140 through which IR radiation 150 can pass unhindered. The IR radiation falling on IR sensor 10 is absorbed by IR absorbing material 12, which causes an increase in the temperature of absorbing material 12 and a corresponding signal change from temperature measurement unit 13.

Figure 3:
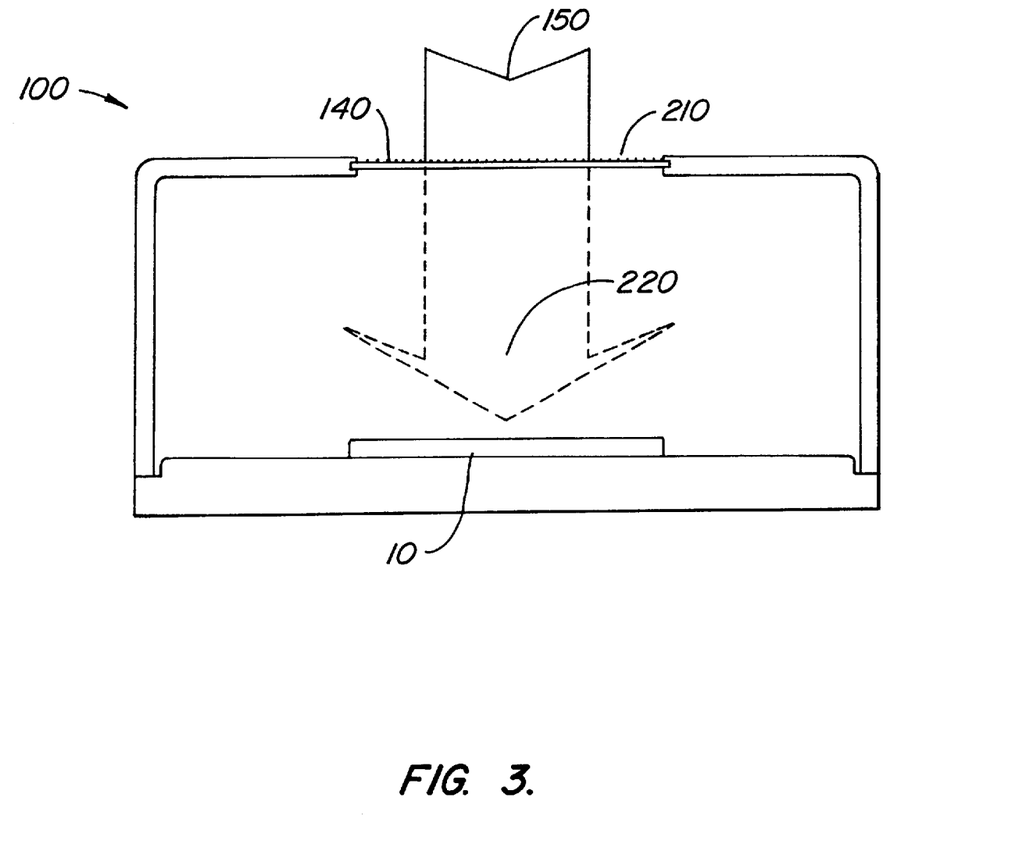
FIG. 3 is a schematic diagram showing effects of contamination on the IR transmission of the transmission window.

FIG. 3 is a schematic diagram showing effects of contaminants 210 on the IR transmission properties of transmission window 140. When present on window 140, contaminants 210 typically absorb a portion of incoming IR radiation 150 so that less IR radiation is passed through to sensor 10. The dotted lines of attenuated IR radiation 220 indicate that the amount of IR radiation passed through window 140 is less than the amount of incoming IR radiation 150. In general, the greater the amount of contaminants 210 deposited on window 140, the greater the absorption of incoming IR radiation 150, and therefore, the greater the attenuation resulting in IR radiation 220.

Figure 4:
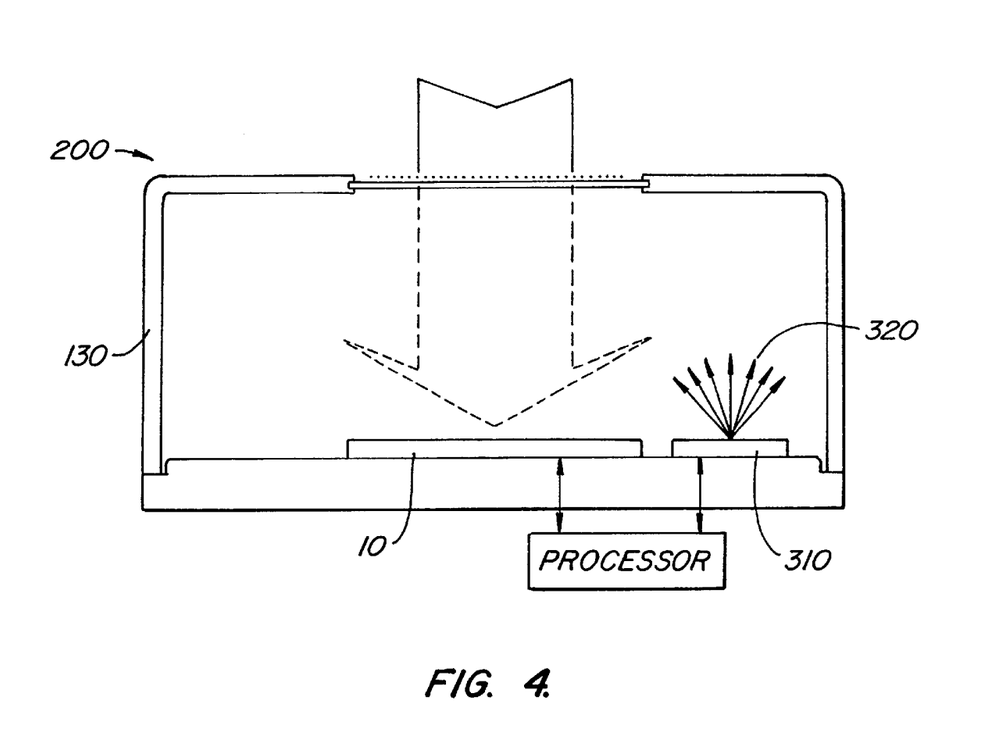
FIG. 4 is a schematic diagram showing an arrangement of an IR sensing device including an IR radiator according to an embodiment of the present invention.

FIG. 4 is a schematic diagram showing an arrangement of an IR sensing device 200 including an IR radiator 310 according to an embodiment of the present invention. There is mounted within the enclosure 130 an IR radiating device 310 which is electrically controlled to emit IR radiation 320. Preferably, IR radiating device 310 is thermally isolated from IR sensor 10 so as to avoid heat transfer from IR radiating device 310 by either conduction or direct radiation.

Figure 5:
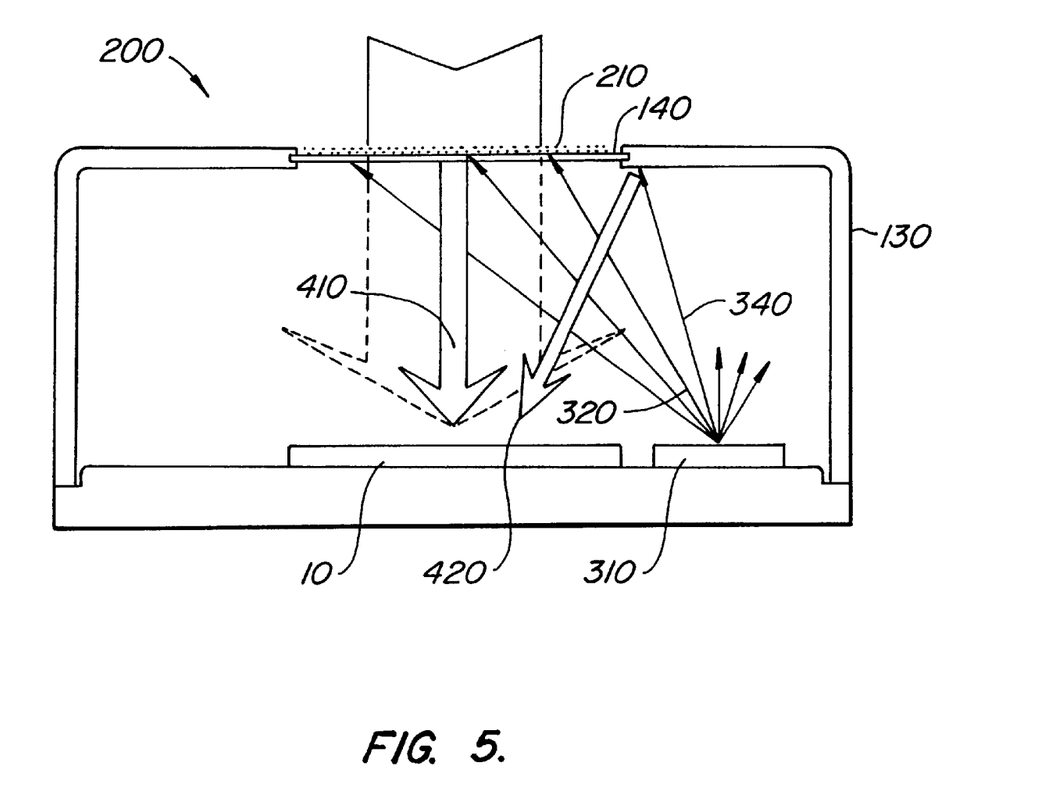
FIG. 5 is a schematic diagram showing the effects of IR radiation emitted from the IR radiator.

FIG. 5 is a schematic diagram showing the effects of IR radiation emitted from IR radiator 310 in IR sensing device 200. When an electrical signal is applied to IR radiating device 310, IR radiation 430 is emitted. Some of the radiated energy 430 falls on IR window 140. If window 140 is free of contaminants 210, IR radiation 430 passes through window 140 and is dissipated into the surrounding environment. When window 140 is obscured wholly or partially by an IR-opaque contaminant 210, some of radiated energy 430 is absorbed by contaminant 210. The temperature of contaminant 210 increases as a direct result of the absorption of radiated energy 430, thereby causing a corresponding increase in the level of IR radiation 410 emitted from contaminant 210. This increase in IR radiation 410 is detected by IR sensor 10. It will be appreciated that some of the IR radiation 440 radiated by IR radiator 310 does not fall on window 140, but rather falls on the inside of enclosure 130. This causes a temperature rise in enclosure 130. This temperature rise results in a corresponding increase in IR radiation 420 emitted by enclosure 130 which is also detected by IR sensor 10.

Figure 6A:
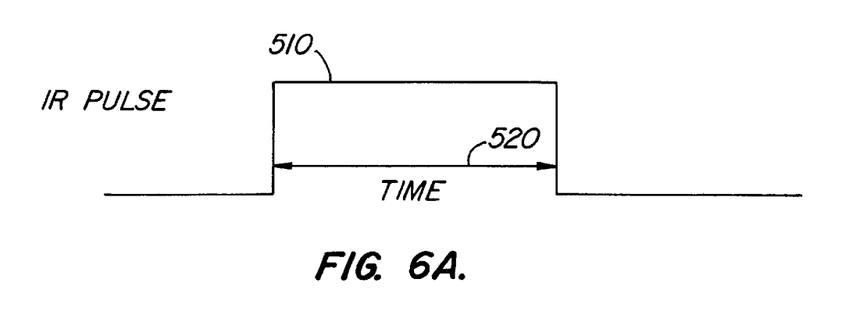
FIGS. 6a and 6b are schematic diagrams showing an IR pulse and associated return signals, respectively, according to the present invention.
Figure 6B:
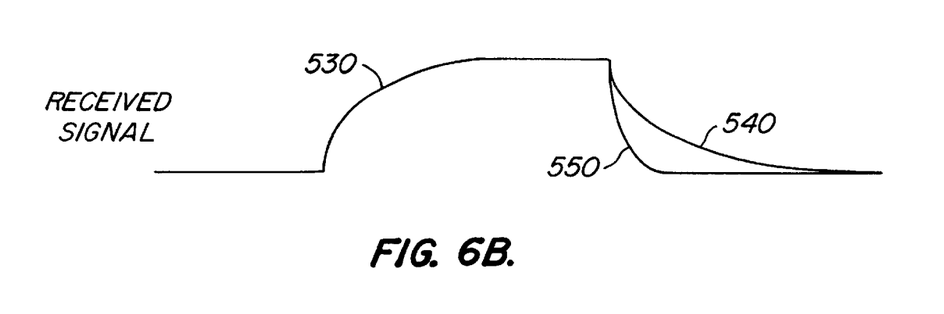

FIGS. 6a and 6b are schematic diagrams showing an example of an IR pulse emitted by radiator 310 and associated return signals (IR radiation emitted by contaminants 210), respectively, according to the present invention. When an electrical pulse 510 is applied to IR radiator 310 for a time 520, the signal generated by temperature measuring unit 13 of IR sensor 10 rises and falls in response to the IR radiation emitted by the enclosure and contaminants 210 as shown in FIG. 6b. If there are no contaminants then the return signal 550 will have a shorter decay time. If contaminants are present, the return signal 540 from the contaminants will have a longer decay time. The decay time will vary depending on the specific contaminant(s). When radiator 310 is pulsed, for example for 50 milliseconds, sensor 10 sees a return signal dependent upon the heating effect of the outgoing pulse of IR radiation. This return signal will have a number of components each with their own characteristics. Each component is separately measured as desired. The return signal is a good indication of the reduction of the effective area of window 140 since only the signal falling on IR-opaque contaminants 210 has a heating effect which therefore causes a temperature rise and a return signal. The greater the surface area of window 140 rendered opaque the greater the return signal.

Manual application of contaminants of differing composition allows for accurate re-calibration curves to be established and for a correct re-calibration constant to be programmed into the sensor device. Further, the rate at which the return signal decays is indicative of the thermal bonding between sensor 10 and the structure which may be indicative of corrosion in or around the sensor mounting.

Given that the thermal conductivity of the contamination is different from the thermal conductivity of the enclosure then by design, selection of materials or application of specific contaminants on window 140, the decay time of the temperatures of enclosure 130 and contaminants 210 will also be different. At the end of the radiated IR pulse the returned IR signals from contaminants 210 and enclosure 130 will show this difference. If there are no contaminants 210 then the return signal 550 will have a shorter decay time. If contaminants 210 are present, the return signal 540 from contaminants 210 will have a longer decay time.

An electronic signal processor, coupled to sensor 10 and to IR radiator 310, is provided to control IR radiator 310 and to receive and analyze the electrical signal from temperature measurement unit 13. The processor determines the characteristics of contaminants 210 and determines the gain necessary to compensate for the difference in window transmissibility. Preferably, the processor includes a digital microprocessor and an analog-to-igital converter (ADC). The signal from temperature measuring unit 13 is applied to the ADC, and the resulting digital signal is then processed by the microprocessor. The compensation and calibration constants are stored in a digital non-volatile memory coupled to the processor.

It will be appreciated that additional signals can be generated by the signal processor to indicate the amount of contaminants 210 on window 140 or to signal that the magnitude of such contamination has exceeded a predetermined threshold and that the accuracy of the compensated signal may now be outside predetermined limits. It will be further appreciated that all or some of the components of the signal processor can be integrated into the same substrate 11 with IR sensor 10.

In addition to the detection of the degree of contamination on window 140 by IR-opaque material, the invention can also detect changes in the IR reflection characteristics of enclosure 130. This addition capability permits the generation by the signal processor of additional warning signals indicating deterioration of enclosure 130 due to contamination or leakage. A change in the rate of decay of the signal reflected from enclosure 130 is indicative of changes in the conditions of the mounting of the sensor 10 and/or enclosure 130 due perhaps to contamination, material deterioration such as corrosion or mechanical wear or creepage. Extraction of an indication of such changes from the return signals by the signal processor permits the generation of warning signals.

The addition of IR radiator 310 together with a means to control it allows the transmission efficiency of the window to be determined and also to gain an indication of potential risks to the ongoing performance of the sensor installation. All such contraindications can be signaled to a controller (e.g., ECU or CPU) by means specific to the application.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An Infra Red (IR) sensing device comprising:
    an IR sensor for detecting IR radiation, wherein the IR sensor generates electrical signals in response to and indicative of any IR radiation detected by the IR sensor;
    an IR opaque enclosure surrounding the IR sensor, the enclosure having an IR transparent window positioned to allow IR radiation from outside the enclosure to fall on the IR sensor;
    an IR radiator positioned within the enclosure, wherein the IR radiator emits IR radiation, wherein at least a portion of a first IR radiation signal generated by the IR radiator is absorbed by IR-absorbing material on the window, wherein the IR absorbing material emits a return IR radiation signal that is detected by the IR sensor, and wherein the IR sensor generates a first electric signal proportional to the return IR radiation signal; and
    a processor coupled to the IR sensor for analyzing the electrical signals generated by the IR sensor, wherein the processor receives and analyzes the first electric signal to determine characteristics of the return signal.

2. The device of claim 1, wherein the return signal is proportional to the amount of attenuation caused by the IR-absorbing material, wherein the IR sensor also detects a remote IR radiation signal generated by a remote target object, wherein the remote signal is attenuated by the IR-absorbing material on the window by a first amount, wherein the IR sensor generates a second signal proportional to the attenuated remote signal, and wherein the processor determines the gain needed to compensate for the first amount of attenuation caused by the IR absorbing material when analyzing the second electric signal.

3. The device of claim 1, wherein the IR sensor includes an IR absorbing portion coupled to a temperature measuring unit, wherein when the IR absorbing portion absorbs IR radiation its temperature increases by a proportional amount, and wherein the temperature measuring unit measures the temperature of the IR absorbing portion and generates the electrical signals, wherein the electrical signals are indicative of the temperature of the IR absorbing portion.

4. The device of claim 3, wherein the IR sensor further includes a heating element coupled to the IR absorbing portion, wherein the heating element is configured to raise the temperature of the IR absorbing portion by a controlled amount so as to assist in calibrating the IR sensor.

5. The device of claim 1, wherein the processor includes a means to control the IR radiator to emit the first IR radiation signal.

6. The device of claim 5, wherein the control means controls the IR radiator to emit the first IR radiation signal in the form of one or more pulses, wherein the return signal includes one or more decaying pulses, and wherein the processor analyzes the first electric signal to determine the decay time of the decaying pulses.

7. The device of claim 5, wherein the processor includes a means for determining the degree of contamination obscuring the window by analyzing characteristics of the first electric signal.

8. The device of claim 7, wherein the processor further includes a means for modifying the characteristics of the electrical signals generated by the IR sensor in response to any IR radiation detected from a remote target object so as to compensate for the degree of contamination obscuring the window.

9. The device of claim 1, wherein the housing has an inner surface that reflects IR radiation, wherein if the inner surface of the housing is deteriorated it absorbs a second portion of the first IR radiation signal generated by the IR radiator, wherein the inner surface emits a second return IR radiation signal that is detected by the IR sensor, and wherein the IR sensor generates a second electric signal proportional to the second return signal.

10. The device of claim 9, wherein the processor includes a means for determining an amount of deterioration of the inner surface of the housing from the second electric signal.

11. The device of claim 1, wherein the processor includes a means for determining an amount of IR-absorbing material on the window using the characteristics of the return signal.

12. The device of claim 1, further comprising a memory unit coupled to the processor, wherein the processor determines at least one calibration constant from the characteristics of the return signal, and wherein the processor stores the at least one calibration constant to the memory unit.

13. A method of measuring the temperature of a remote target object with an IR sensing device, wherein the IR sensing device includes an IR sensor mounted in a housing, the housing having a window through which IR radiation from a remote target object enters the device and impinges on the IR sensor, the method comprising the steps of:
generating a first IR radiation signal with an IR radiator located within the housing, such that if there is any IR-absorbing contamination on the window, the contamination absorbs at least a first portion of the first IR radiation signal and emits a return IR radiation signal;
detecting the return IR radiation signal with the IR sensor;
generating a first electric signal in response to the return IR radiation signal, wherein the first electric signal is proportional to the return signal;
analyzing the first electric signal with a processor to determine the amount of IR radiation in the return signal, wherein the amount of IR radiation in the return signal is indicative of the amount of IR absorbing contamination on the window; and thereafter
detecting a remote IR radiation signal generated by the remote object, wherein the remote IR radiation signal is indicative of the temperature of the remote object, wherein the remote signal is attenuated by a first amount by the IR absorbing contamination before being detected by the IR sensor; and
compensating for the first amount of attenuation in the detected remote IR radiation signal so as to accurately determine the temperature of the remote object.

14. The method of claim 13, further comprising the steps of:
determining a calibration constant with the processor, wherein the calibration constant is a function of the amount of IR absorbing contamination on the window; and
storing the calibration constant to a memory unit for later use.

15. The method of claim 14, wherein the step of compensating includes applying the calibration constant to the detected remote IR radiation signal.

16. The method of claim 13, wherein the first IR radiation signal is generated in the form of one or more pulses, wherein the return signal includes one or more decaying pulses, and wherein the step of analyzing includes analyzing the first electric signal to determine the decay time of the decaying pulses.

17. The method of claim 13, wherein the housing has an inner surface that reflects IR radiation, wherein if the inner surface of the housing is deteriorated it absorbs a second portion of the first IR radiation signal generated by the IR radiator, the method further including the steps of:
emitting a second return IR radiation signal by the inner surface of the housing;
detecting the second return IR radiation signal with the IR sensor; and
generating a second electric signal proportional to the second return signal.

18. The method of claim 17, further including the step of determining an amount of deterioration of the inner surface of the housing from the second electric signal.

19. An Infra Red (IR) sensing device comprising:
an IR sensing means for detecting IR radiation, wherein the IR sensing means generates an electrical signal responsive to and indicative of the level of IR radiation falling on it;
electronic interface means for processing the electrical signal, wherein the interface means generates a signal representative of the IR radiation;
an IR opaque enclosure surrounding the IR sensing means and the electronic interface means, the enclosure including an IR transparent window arranged to allow IR radiation from a remote target object to fall on the IR sensing means;
an IR radiating means for emitting IR radiation within the enclosure, the IR radiation means being arranged to radiate IR energy so as to have a heating effect on any non IR transparent contamination obscuring the IR transparent window;
a first control means for controlling the IR radiation means to radiate IR energy for a known period;

a signal processing means for determine the degree of contamination obscuring the IR transparent window by measuring the shape and characteristics of the electrical signal during and after the known period; and a second control means for modifying the characteristics of the electronic interface means to compensate for the degree of contamination.

20. The device of claim 19, wherein the signal processing means generates signals indicating the level of IR opaque contamination on the IR transparent window.

21. The device of claim 19, wherein an inner surface of the enclosure reflects IR radiation, wherein the signal processing means generates signals indicating deterioration of the inner surface of the enclosure determined by a change in IR reflectivity of the inner surface.

22. The device of claim 19, further comprising a mounting means for mounting the IR sensing means to the enclosure, wherein the signal processing means generates signals indicating deterioration of the mounting means.

23. The device of claim 22, wherein the deterioration of the mounting means is determined by changes in the time constants of the decay of the temperature of the enclosure.

24. The device of claim 19, wherein the sensing means is integrated in a substrate, and wherein the interface means and signal processing means are integrated into the same substrate as the sensing means.

25. The device of claim 19, wherein the sensing means is integrated in a substrate, and wherein the IR radiating means is integrated into the same substrate as the sensing means.

26. The device of claim 19, wherein the signal processing means includes a microcontroller.

27. The device of claim 19, further comprising a memory coupled to the signal processing means, wherein the calibration and configuration for the signal processing means is implemented in the memory.

28. The device of claim 19, wherein the IR sensing means includes a sensing element for absorbing IR radiation, the device further comprising a heating means for raising the temperature of the sensing element by a controlled amount to assist in calibrating the sensing element.

* * * * *